Patented June 15, 1943

2,321,621

UNITED STATES PATENT OFFICE 2,321,621

TREATING ANIMAL TISSUE

John M. Ramsbottom, Chicago, Ill., assignor to Industrial Patents Corporation, Chicago, Ill., a corporation of Delaware No Drawing. Application March 10, 1941, Serial No. 382,588

19 Claims. (Cl. 99—175)

This invention relates to the treatment of animal tissue, and particularly to the treatment of flesh and intestines with an enzymic material to improve the value thereof.

One of the objects of this invention is to provide a method whereby animal tissue may be rendered tender and improved in other properties.

Another object of this invention is to provide a method whereby the flesh of edible animal carcasses may be rendered tender.

Another object of this invention is to provide a method whereby animal intestines may be rendered tender and more adaptable for use as sausage casings.

Another object of this invention is to provide a method of treating natural sausage casings to increase the stretchability of the casings and to increase the stuffing capacity of the casings.

Another object of this invention is to provide a method whereby the smoking properties of the casings may be altered.

Another object of the invention is to provide a method whereby such tough casings as hog casings and Indian sheep casings may be tendered to any desired extent and rendered useful in the manufacture of high grade sausage products which require a tender casing.

Other objects of this invention will be apparent from the description and claims which follow.

The process is applicable to the treatment of various types of animal tissue, such as wholesale or retail cuts of meat, including beef and pork. It is also applicable to the treatment of meat in various degrees of comminution, such as hamburger, sausage and the like. The treatment of sausage may take place before or after the meat is stuffed into casings.

The invention is particularly adaptable to the treatment of hog casings, Indian sheep casings, and beef casings, although it is not limited to the treatment of these specific types of materials.

Natural casings, as distinguished from artificial or synthetic casings, are prepared from the intestines of edible animals, such as cattle, swine and sheep. After the intestines are removed from the carcass, they are cleaned to obtain a tubular membrane appropriate for sausage casings.

Sheep casings command a higher price because they generally possess more desirable physical properties than hog casings, Indian sheep casings and beef casings. Hog casings are suited for the manufacture of frankfurters and other sausages similar in size, but because of physical characteristics they cannot be used successfully in the manufacture of high grade frankfurters and fresh pork sausages because the casing is objectionable, being difficult to masticate. The same is true of Indian sheep casings and beef casings. Moreover, the casing is the most difficult part of the sausage to digest and it is highly desirable to have a casing possessing a greater stretchability so that the ratio of casing to sausage meat may be reduced to as low a point as possible.

The present invention contemplates the treatment of animal tissue including flesh and natural casings prepared from animal intestines with an extract from the fig tree, or with other aqueous solutions of ficin, the proteolytic enzyme present in fig tree extract, and controlling the action of the ficin on the casings in such a way that the physical properties of the casings are improved efficiently and quickly without undue digestion or other undesirable effects.

I am aware that it has been proposed heretofore to treat meat with certain enzymes to obtain tendering. For example, the patent to Paddock, et al., United States Patent No. 2,043,392, discloses the injection of proteolytic enzymes into the vascular system of carcass beef and then holding the treated product under refrigeration. There is no disclosure in that patent of treating natural casings with an enzyme nor the treatment of animal tissue under the conditions of the present invention whereby applicant's results could be obtained. The patent to Marcano, United States Patent No. 441,181 discloses the preparation of a meat peptone in which the meat is completely disintegrated into a liquid or soluble pasty form. The Marcano patent has no disclosure or suggestion of tendering any kind of animal tissue. None of these patents mentions ficin or fig juice, the material effectively employed in the present invention.

According to the present invention, animal tissue is treated with fig extract or ficin under conditions of treatment including strength of the enzymic solution, temperature and time, coupled with steps of operation whereby new and different results from the prior are are obtained.

The ficin solutions may be prepared from the enzyme or from the fresh or frozen fig extract that may be obtained by extracting the enzymic juice from the sap wood, stalks, stems, fresh leaves and fruit of the fig trees containing ficin, which sources have not been subjected to a temperature sufficiently high to destroy the enzymic action of the extract. Solutions containing about 1 part of fig juice or extract to about 1 to 200 parts of water are satisfactory under the conditions of treatment herein specified. The concentrations vary with the nature of the tissue treated and the other conditions, such as time, temperature and method of operation.

The proteolytic enzyme, ficin, may be obtained from the fig juice or extract by any method suitable for the isolation of a proteolytic enzyme. These methods include precipitation with ethyl alcohol, acetone, methyl alcohol, salts and the like, adsorption and elution. Solutions containing concentrations of ficin that are equivalent to concentrations of fig juice of a fraction of a percent to 100%, which solutions contain about 0.002 to about 5% of active ficin, are usually employed. For example, a solution containing about 0.005 to 0.01% of active ficin is satisfactory, although solutions containing ficin in larger amounts, for example 0.05 to 0.1% or more, are contemplated for this use. Solutions of the lower range are generally used for treating meat. Solutions of the higher range are more satisfactory for treating intestinal tissue, such as natural casings.

In the use of a solution of ficin, it has been found that ficin is most active when employed in a solution having a hydrogen ion concentration approximating that of the natural juice. However, ficin is active when used in solutions varying over a wide range of hydrogen ion concentrations, e. g., a pH between 4.0 and 8.5. It is advantageous to maintain the pH value below 7 for maximum enzyme activity, for advantages in dye absorption by the products, and particularly for treating meat and stuffed sausages in order to avoid detrimental alkaline action on the meat.

The natural juice or other solution of ficin may be applied to the tissue in any suitable manner as by washing, soaking, injecting, spraying, dipping or wiping.

It will be understood that the time of treatment, the temperature of treatment, and the concentration of the solution are all variable and should be adjusted to secure the desired extent of tendering, which is dependent upon the type and the initial toughness of the tissue. The activity of ficin increases with increasing temperature until a condition of greatest activity is reached at temperatures between about 140° and 160° F. The ficin is inactivated at a temperature between about 160° and 175° F.

The product previously treated by any of the methods described hereinbefore is subjected to a temperature within the range of enzymic activity but substantially above refrigeration temperatures, preferably between about 60° and 140° F., and maintained at such temperature in contact with the previously applied fig tree extract or ficin for a sufficient length of time to permit the enzyme to act upon the tissue whereby the desired alteration in physical properties is effected. The temperature may then be raised to a point sufficiently high, for example to a temperature of about 180° F., to inactivate the enzyme and avoid excessive action on the tissue. As an alternative method, the treated product may be thoroughly flushed with water before or after the final heat treatment to remove the major portion of the enzymic material. The action of the enzyme may be terminated by other means than heating or washing, such as the application of a suitable chemical reagent.

In the treatment of meat tissue the ficin solution may be applied to the meat by any of the foregoing methods. The previously treated meat is then held at a temperature of above about 60° F. and within the range of enzymic activity until the desired degree of tenderization takes place. The temperature of the meat is then raised to a point at which the ficin is substantially inactivated. This tenderization process may be accomplished by gradually heating the meat to which the ficin has been applied from room temperature to cooking temperature and finally enzyme inactivation temperature. The temperature rise through the gradient is at such a rate that the meat is tenderized by the enzyme in its active range. When the desired degree of tendering results, the temperature is substantially raised to stop further enzymic action. The type, toughness and size of the meat cut, and the activity of the enzyme solution, determine the time and temperature of heat treating.

As an illustration of the tenderizing of meat by this process, a normally tough muscle from the hind shank of the right side of a beef carcass (peroneus tertius) was treated with an enzyme solution containing about 0.008% ficin by injecting it into the primary artery supplying the circulatory system of the cut. The amount of enzyme solution injected was about 8% of the muscle weight. An enzyme-treated right side muscle and a non-treated control left side muscle were cut into slices about one-half inch thick. These slices were heated gradually from room temperature to a temperature of about 160° F. in about 10 to 15 minutes. The enzyme was then inactivated by quickly raising the temperature substantially above this value. The cooked, treated product was compared with the cooked control. In all cases the treated muscle slices were tender whereas the control muscle slices were tough.

It is possible to similarly prepare previously treated beef rounds to obtain steaks and roasts which when heat treated first in the active enzyme temperature range followed by a high heat treatment to inactivate the ficin will yield cooked cuts substantially more tender than those not so treated with ficin. In all these treatments the steaks and roasts are fried, broiled or roasted to an inside temperature of at least 160° F. and tenderness comparisons made on the cooked meat. Of course with these larger cuts longer periods of treatment, e. g., up to 45 minutes or 1 hour, are generally necessary in order to raise the temperature of the meat through the active enzyme range.

In treating the beef rounds the ficin solution alternatively may be introduced into the cut by means of hypodermic needles until the desired amount of enzyme solution based on the weight of muscle is obtained. For example, an aqueous solution of about 0.005% ficin may be injected by needles into the cuts of meat, e. g., beef steak cuts, or into the circulatory system in an amount equal to about 6% of the weight of the meat to prepare it for the heat tenderizing treatment.

In the treatment of sausage casings the fig tree extract or other solution of ficin may be applied to the casing in any suitable manner as by washing or soaking the casing in the solution, adding ficin or fig tree extract to the sausage cook water, or spraying, dipping, or wiping the casing with the ficin solution or fig tree extract after the casing has been stuffed with sausage meat. The casing may be treated, however, before or after stuffing, and greater improvement in stretchability is sometimes obtained by treatment before stuffing.

The casing with the applied enzyme may be heated to a temperature above about 60° F., for example between about 110° and 140° F., and maintained at such temperature for a sufficient length of time to permit the enzyme to attack the tissue to the desired extent, e. g., ½ to 3 hours. The temperature is then raised to a point high enough to destroy the major portion of the enzyme and avoid excessive action on the casing. The improvement of stuffed casings by this enzymic action is preferably accomplished in two steps; a conditioning of the stuffed casing at a lower temperature, e. g., 80° to 90° F., followed by the smoking of the stuffed casing at a higher temperature after which the enzyme is inactivated, e. g., by cooking. In some instances it may be desirable to omit the separate tempering or conditioning step, and to secure the conditioning and smoking in a single operation. When the conditioning and smoking take place in one operation, the temperature in the smoke house may be raised through a wide range, at least a portion of which is in the field of enzymic activity, and the temperature rise through this gradient may be rather slow.

The present invention may be practiced by treating the casings after stuffing as well as before stuffing. In the treatment of casings after stuffing, basins or receptacles may be placed at the end of a conventional stuffing table. One basin is equipped with an overflow and warm water is passed continuously through the basin, the other basin serving as a receptacle for the fig tree extract or other dilute solution of ficin. A satisfactory aqueous solution may be prepared containing about 0.05% active ficin, which is then placed in the proper receptacle. After the sausages are stuffed and linked, the operator dips the sausages in the warm running water basin, immersing the sausages 2 or 3 times to rinse off particles of meat from the surface of the casings. The sausages may then be immersed 2 or 3 times in the fig juice or ficin solution, care being taken to have the solution reach all portions of the outside surface of the casings. In a commercial treatment of the natural casings, it is preferred to thoroughly spray the stuffed casings with an aqueous solution of about 0.05 to about 0.08% ficin for about 3 minutes.

It will be understood, of course, that the time or treatment, the temperature of treatment, and the concentration and activity of the solution are all variable and may be adjusted at will to secure the desired alterations in the physical properties of the casings, and are dependent upon the use to which the casings are to be put and the initial properties of the casings.

After the application of the enzyme by any of the foregoing methods, the product with the enzyme thereon may be placed in a tempering room for a period of about 1 hour and 30 minutes with an air temperature of from 80° to 120° F., preferably 80° to 90° F., and a relative humidity of about 80% to 85%. The product is then removed to a preheated smoke house having temperatures sufficiently high to cure the product, for example, at a temperature of from 120° to 170° F. The product is usually kept in the smoke house for about 45 minutes up to 1 or 2 hours, during which time a gradual increase in temperature from about 120° to about 150° or 160° F. may be obtained in about 1½ hours. The air temperature, if desired, may then be raised to 170° to 200° F.; for example, to a temperature of about 180° F., and maintained at this temperature for about 15 minutes to inactivate the enzyme. Preferably, after the curing operation, the product may be cooked in water or steam, in which case it is desirable not to exceed a temperature of about 180° F. The preferred cooking treatment is to place the frame with the smoked sausage links in a cooking chamber where the sausages are sprayed with hot water at a temperature of about 170° F. for about 12 to 15 minutes, thereby inactivating and removing the enzyme. A direct steam chamber at the same temperature may be similarly employed.

The treatment of natural casings according to the present invention produces a product of greatly improved tenderness. For example, ordinary untreated casings are often so tough that it is difficult to break or puncture a stuffed sausage by bending, biting, chewing or pulling, whereas the casings treated by the present invention are easily broken by bending and may be readily punctured by gentle pressure with a finger or thumb.

The improvement in and uniformity of tenderness of the treated casings may be more precisely shown by penetrometer measurements of the force necessary to puncture a sausage casing. The penetrometer consists of a steel ball having a diameter of $\frac{7}{16}$" mounted upon a rod having a smaller diameter, which is attached to a pressure gauge. A measure of the toughness of the casing may be obtained by puncturing the stuffed casing with the steel ball. The deviation in penetrometer readings between treated casings is in general about one-half as great as the deviation for untreated casings.

The process of the present invention also produces other improved properties in the treated casings. Among them are increased translucency and improved smoking properties. These improved properties appear to be due at least in part to an increased quantity of water absorbed by the casing. The treatment of a casing with fig tree extract or other dilute aqueous solutions of ficin produces a noticeable tendency for the casing to swell, accompanied by a marked increase in the amount of water absorbed by the casing. As a result, smoke penetrates the wet surface more rapidly and to a greater extent than the drier surface of an ordinary casing. Moreover, the casing dries out more slowly than untreated casings and, as a result, provides a longer effective smoke period due to the more rapid and continued penetration of the smoke.

The increase in the water absorbing property of treated casings as compared to untreated casings may be illustrated by the data given below. Casings graded to the same size are selected, one group being handled in the normal conventional manner, the other group being treated in accordance with the present invention. In the treatment of the casings in accordance with conventional practice, the salted casings are soaked in water to remove the salt and are then flushed with water. The other group of casings is soaked in water for about 30 minutes to remove the salt, treated with an aqueous solution of about 0.0075% active ficin, held in contact with the applied enzyme at a temperature of from 70° to 75° F. for about 2 hours, and then flushed with water. The percentage gain in weight of treated casings will vary from about 2 to 4 times the percentage gain in weight of untreated casings.

Furthermore, the treatment of natural casings in accordance with my invention also increases the stretchability of the casings and thereby increases the stuffing capacity of the casings. Casings graded to the same size may be handled as described above to prepare the casings for stuffing. Upon stuffing the casings under identical stuffing conditions, the diameter of the treated casings will be found to be up to about 10% greater than the diameter of untreated casings.

The increase in stuffing capacity will, in general, vary from about 8% to about 15%, depending upon the characteristics of the casings, concentration of fig tree extract or other ficin solution used, and upon the length of the period of treatment of the casings.

The treatment of the casings with fig tree extract or other aqueous solution of ficin also renders the casings more slippery than conventional casings. Before stuffing, casings are placed upon or threaded on a stuffing horn and it is desirable to have the casing as slippery as possible so that it may be easily threaded on the stuffing horn. In conventional practice, a water connection is provided on the stuffing table and the operator places the casing over the water nozzle and admits a small amount of water prior to threading the casing upon the stuffing horn. Casings treated in accordance with my invention may be placed on the stuffing horn without first admitting a small amount of water to the casing.

The dye absorption properties of the casings are also improved by the present process in that the casings require a smaller concentration of dye to produce the same intensity of color as compared to untreated casings. This is important when the product is labeled by stamping using a dye for the purpose.

This application is a continuation in part of application Serial No. 366,784, filed November 22, 1940, which application is a continuation in part of application Serial No. 301,958, filed October 30, 1939, which application in turn is a continuation in part of application, Serial No. 224,402, filed August 11, 1938.

As many widely different embodiments of the present invention may be employed without departing from the spirit or scope thereof, this invention is not intended to be limited except as defined in the following claims.

I claim:

1. The process for the treatment of animal tissues, which comprises subjecting the tissue to the action of ficin in sufficient amount to cause tenderizing of the tissue for a time sufficient to obtain substantial tenderization without material disintegration of the tissue, maintaining the temperature during the treatment within the range of active enzymic action of ficin, and then arresting the action of said enzyme.

2. The process for the treatment of animal tissues to improve the physical properties thereof including tenderization, which comprises applying to the tissue a non-alkaline solution of ficin of sufficient strength to cause tenderization of the tissue, holding the tissue in contact with the ficin for sufficient time to obtain a substantial amount of tenderization, but insufficient to cause material disintegration of the tissue, while maintaining the temperature within the range of active enzymic action of ficin and then subjecting the treated product to temperatures sufficiently high to arrest the enzymic action of the ficin.

3. The process according to claim 2 in which the solution of ficin is an aqueous solution containing 0.002 to 0.1% of ficin.

4. The process according to claim 2 in which the solution of ficin is an aqueous solution containing about 0.005% ficin.

5. The process according to claim 2 in which the solution of ficin contains fig juice.

6. The process for the manufacture of sausage stuffed in natural casings which comprises applying to the sausages a solution containing ficin in sufficient amount to cause tenderization of the casings, permitting said solution to act upon the casings for sufficient time to cause a substantial amount of tenderization by the enzymic action of the ficin, but insufficient to cause substantial disintegration of the casings, and thereafter smoking and cooking the treated product at temperatures sufficiently high to arrest the activity of the ficin.

7. The process for the treatment of natural casings to improve the physical properties which comprises subjecting the casings to the action of a solution containing ficin in sufficient amount to cause improvement in the physical properties including the tenderness, maintaining the temperature in the range of active enzymic action of the ficin for sufficient time to cause substantial improvement in the tenderness of the casings, but insufficient to cause substantial disintegration of said casings, and then subjecting the treated casings to temperatures sufficiently high to arrest the enzymic activity of the ficin.

8. The process according to claim 7 in which the reaction temperature of the ficin on the casings is within the range of about 60° to 160° F.

9. The process according to claim 7 in which the solution of ficin is an aqueous solution containing 0.005% ficin and is applied to stuffed natural casings by spraying thereon.

10. The process according to claim 7 in which the time of action of the ficin on the casing is within the range of about 30 to 180 minutes.

11. The process for the treatment of stuffed natural casings normally tending to be tough which comprises subjecting the stuffed casings to the action of fig juice in sufficient amount to cause substantial improvement in the physical properties thereof, maintaining the temperatures within the range of active enzymic action of said juice for sufficient time to improve substantially the physical properties of the casings including the tenderness, but insufficient to cause substantial disintegration of the casings, and then subjecting the product to smoking and cooking at temperatures sufficiently high to arrest the enzymatic activity of the fig juice.

12. The process according to claim 11 in which the fig juice is an aqueous solution containing 0.002 to 0.1% of ficin.

13. The process according to claim 11 in which the treating temperature of the fig juice on the casings is at least about 60° F. and the treating time is within the range of about 30 to 180 minutes.

14. The process according to claim 11 in which the smoking and cooking temperature is within the range of about 120° to 180° F.

15. The process for the treatment of sausages stuffed in natural casings normally tending to be tough and difficult to smoke, which comprises contacting the sausages with fig juice, conditioning the treated sausages at a temperature of at least about 60° F. and below about 160° F. for a period of time sufficient to cause substantial tenderizing of the casings, but insufficient to cause material disintegration of said casings, while maintaining a relative humidity sufficient to prevent substantial dehydration of the sausages, smoking the treated sausage while hot at a temperature within the active range of the fig juice and finally subjecting the resulting product for a short time to temperatures sufficiently high to arrest the enzymic action of the fig juice.

16. A process according to claim 15 in which the temperature of conditioning is at least in part within the range of about 80° and 120° F.

17. A process according to claim 15 in which the relative humidity is about 80 to 85% during the conditioning operation.

18. A process according to claim 15 in which the smoking temperature is at least 120° F. for at least the major fraction of an hour.

19. A process according to claim 15 in which the final temperature treatment is at least about 170° F. for several minutes.

JOHN M. RAMSBOTTOM.